Dec. 29, 1931.  W. SHURTLEFF  1,838,505
HEATING AND VENTILATING UNIT
Filed March 26, 1931  3 Sheets-Sheet 1
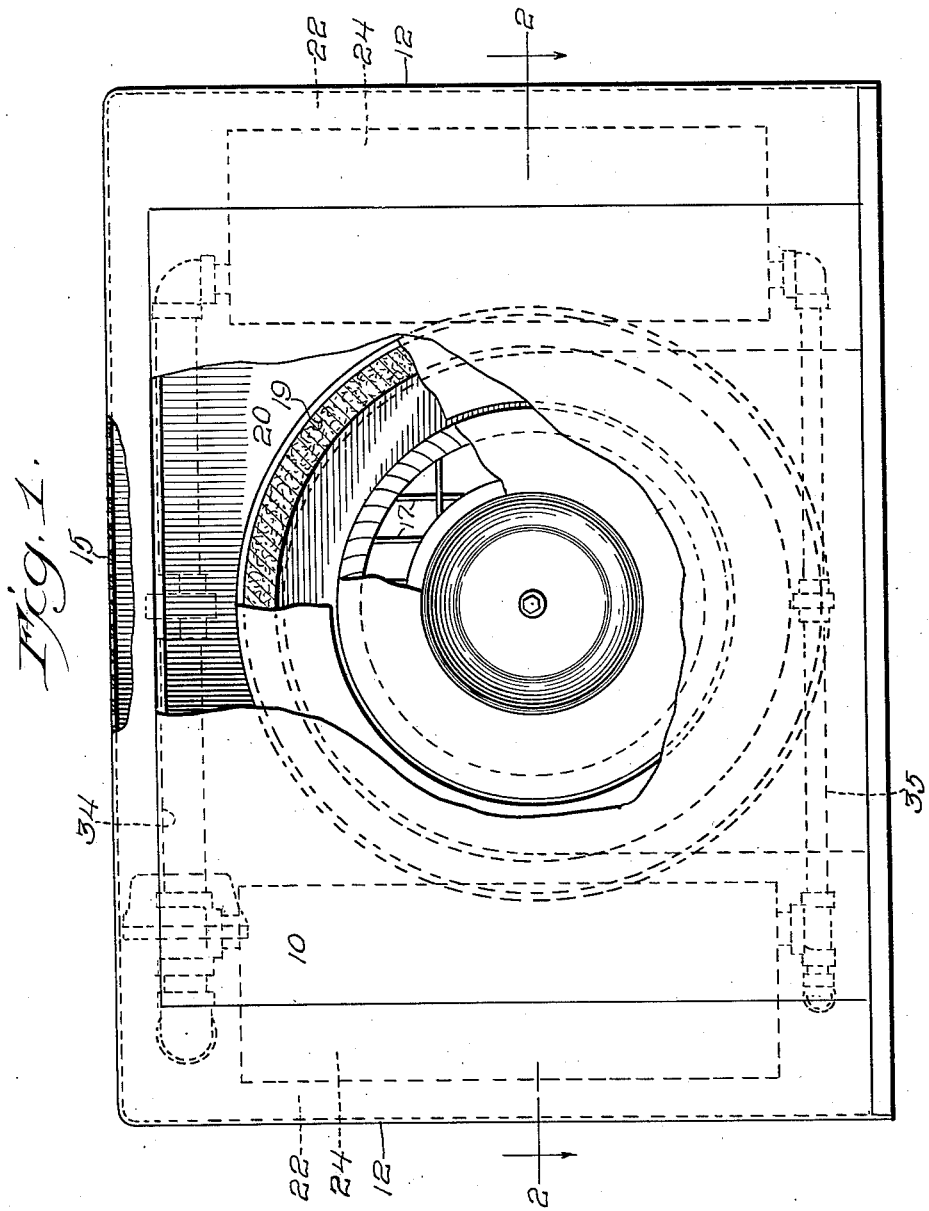

Dec. 29, 1931.   W. SHURTLEFF   1,838,505
HEATING AND VENTILATING UNIT
Filed March 26, 1931   3 Sheets-Sheet 2
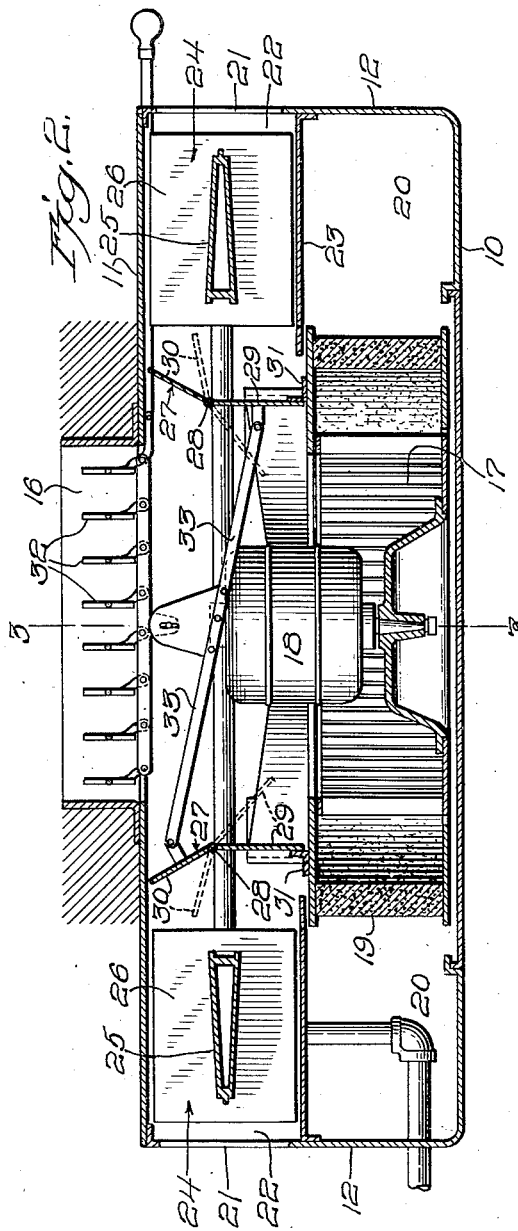
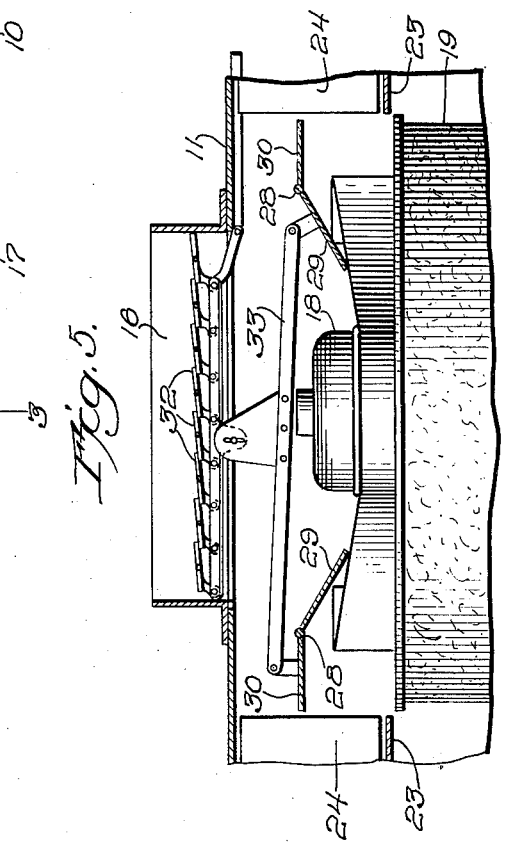
Inventor,
Wilfred Shurtleff
by George J. Haight
Atty.

Dec. 29, 1931.    W. SHURTLEFF    1,838,505
HEATING AND VENTILATING UNIT
Filed March 26, 1931    3 Sheets-Sheet 3

Inventor;
Wilfred Shurtleff
by George I. Haight
Atty.

Patented Dec. 29, 1931

1,838,505

UNITED STATES PATENT OFFICE

WILFRED SHURTLEFF, OF MOLINE, ILLINOIS, ASSIGNOR TO THE HERMAN NELSON CORPORATION, OF MOLINE, ILLINOIS, A CORPORATION OF ILLINOIS

HEATING AND VENTILATING UNIT

Application filed March 26, 1931. Serial No. 525,370.

This invention relates to a heating and ventilating unit.

The present invention relates to a heating and ventilating unit in which provision is made for admitting either indoor or outdoor air, or both together as occasion may require, and in which provision is made within the cabinet of the unit for segregating the air streams to such an extent as to prevent the external air under any adjustment of the apparatus from coming into contact with the radiators, so that no heat will be expended in elevating the temperature of outdoor air which will be admitted solely for the purpose of cooling and tempering the indoor air and to prevent overheating of the room temperature.

The structure of the present unit is so arranged that the outdoor air when admitted will be drawn directly into the fan without being permitted to pass through an extended cold air conduit positioned in close proximity to the heating chamber, so that there will be little or none of the preheating of cold air which is likely to occur in a structure in which the cold air conduit, although walled off from the heating chamber, is nevertheless in considerable degree subject to the effects of heat radiated from the walls of the heating chamber.

The object of the present invention is to arrange the structure of the heating and ventilating unit in such a way as to more perfectly conform to the requirements of conserving the heat for the exclusive heating of indoor air, and of relieving the cool outdoor air from the heating effect during its passage through the unit.

In order to better understand the principle of operation of the present invention, brief reference will be made to the requirements for satisfactory heating and ventilating in accordance with theories now generally approved and accepted by engineers skilled in the heating and ventilating art.

The temperature regulating involves the addition of heat according to weather conditions, the removal of heat occasioned by occupancy and other factors, and the maintenance of a proper balance. A proper heating and ventilating apparatus consequently must incorporate means for supplying heat as needed, means for removing excess heat, and means for properly regulating and maintaining a balance. The usual and customary means for supplying heat to a room or chamber, heretofore, is by utilization of a horizontal steam or hot water radiator, and the most practical and efficient means for removing excess heat and maintaining balance is by the introduction of sufficient outside or fresh air to carry off the excess heat.

Heretofore the practice has been to provide a horizontal source of heat supply within an enclosure providing a passage and a bypass communicating with the chamber to be heated, wherein the air which circulates from the chamber through the passage is directly subjected to the influence of the heat source, and when bypassed it is also subject to radiant heat effects. When the temperature in the room or chamber rises, in order to remove the excess heat, the practice has been to admit fresh air from outdoors into the passage and subject the outside air directly to the influence of the heat source, which preheats the air to a greater or less degree, after which the same is passed into the chamber to be heated.

In this way, large volumes of preheated air are required for no other purpose than to remove excess heat and maintain heat balance, and such procedure is objectionable, since it entails the unnecessary heating of a large fresh air supply over long periods, with consequent wasteful fuel expenditure. In addition, in structures of this character, in mild weather, it is impossible to regulate the temperature, since the outside air necessarily passes through the heating unit, and the only way the temperature may be sufficiently reduced is by cutting off the heat from the heating unit, which requires additional cooling time and the trouble of a constant quickly available heat supply, or danger of cold drafts, and also necessitates the consideration of an additional factor of difficult intermediate graduation in properly controlling the temperature.

An important object of my invention is to provide a heating and ventilating apparatus in which outside fresh air is admitted only as required to control the sensible temperature and maintain heat balance, and wherein no preheating of the fresh air takes place, means being provided whereby the fresh air at outdoor temperatures is mixed with the air already heated by the vertical and divided heat source without preheating of the fresh air by the latter, thereby obviating the wasteful practice of unnecessarily heating large volumes of fresh air in the manner above pointed out, with a consequent saving in fuel expenditure, and additionally, in mild weather, outside fresh air may be admitted directly into the chamber to be heated, hence doing away with the necessity of making finely graduated adjustments of the heat source to gradually cut off or increase the heat supply.

A further and more particular object of the invention is to provide an apparatus of the character referred to, which contemplates the utilization of several sources of air supply, two from within the chamber to be heated and ventilated, and the other from outdoors, which latter admits fresh air at outdoor temperature. In connection with the sources of indoor air supply, an arrangement of two heating compartments, ports, and control mechanisms is employed, so that all of the air from the inside source of supply enters from opposite ends of the enclosure, and none from the outdoor source of supply, and passes through the two heating compartments of the apparatus, the air supplied from the room and that supplied from outdoors being mixed at a point remote from the heat source in various relative amounts, or one or the other entirely cut off, according to the temperature requirements.

Another object of the invention is to provide in an apparatus of the character referred to, means for positively inducing discharge from the apparatus into the chamber to be heated, of both outside and inside air, without the necessity of preheating the air from the outside source by directing it over the heating source.

Further objects and details of the invention will appear from the description thereof in conjunction with the accompanying drawings, wherein,—

Figure 1 is a vertical elevation of the unit of the present invention as viewed from the rear, with the rear wall partly broken away to expose the interior arrangement;

Fig. 2 is a sectional plan view taken on line 2—2 of Fig. 1;

Fig. 5 is a sectional plan view showing the inter-connected damper operating mechanisms for controlling the cold air and hot air dampers respectively.

Figure 4:
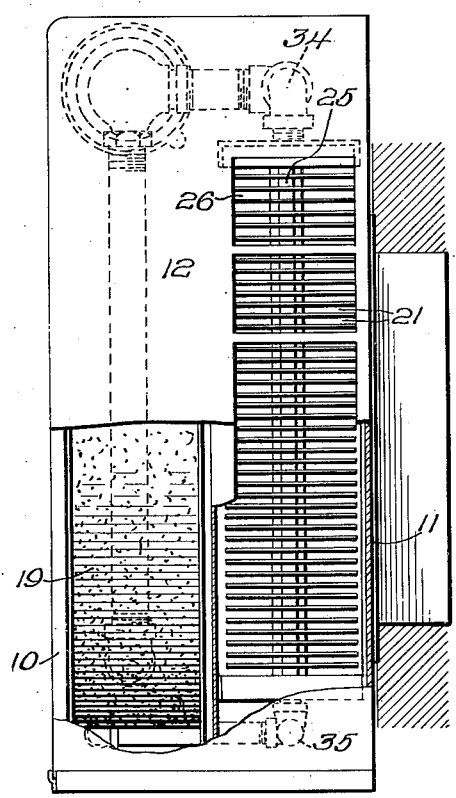
Fig. 4 is an end elevation with the end wall partly broken away to expose the interior arrangement.
Figure 3:
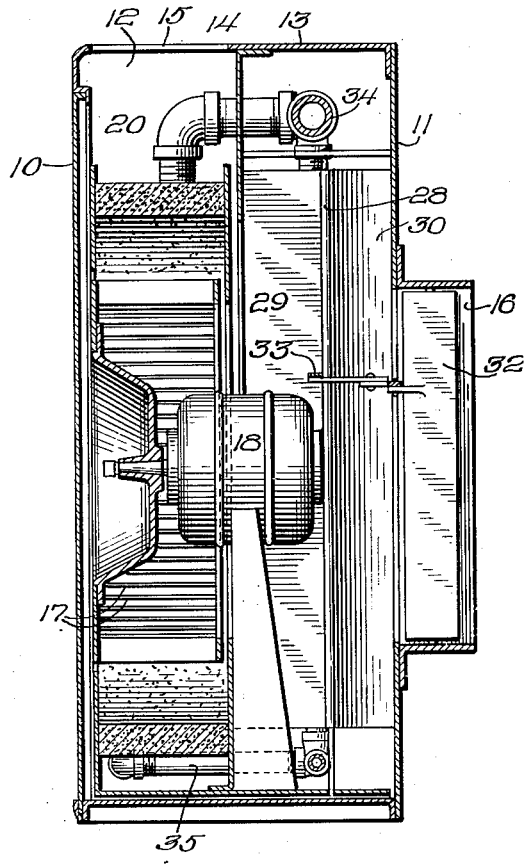
Fig. 3 is a cross sectional elevation taken on line 3—3 of Fig. 2.

The apparatus as a whole is enclosed within a housing provided with a rectangular box-like housing, comprising a front wall 10, a rear wall 11, end walls 12, and a top 13, all preferably composed of sheet metal, and connected together in any suitable manner.

The top is provided in its front portion with a longitudinally extending elongated discharge opening 14 protected by a grille 15, which provides for the upward discharge of the air at high velocity.

The unit is intended to occupy a position closely adjacent to an exterior wall and below the level of the window sill, and to receive outdoor air through the building wall, and through a centrally disposed cold air port 16, which affords an intake for delivering air to the center of the unit and directly into the eye of a fan 17 driven by a motor 18.

The location of the cold air inlet port is such that the air admitted therethrough passes but a short distance through the interior of the unit and directly into the fan, so that no opportunity is afforded for the heating of the stream of cold air flowing to the fan, which thereby tends to conserve the heat to be expended for the heating of indoor air, and at the same time utilizes the cooling effect of outdoor air to the greatest possible extent.

The outdoor air delivered into the fan is discharged upwardly through an arch shaped filter 19 which surrounds the periphery of the fan, and into a discharge chamber 20 at the top of the unit, and thence upwardly through the discharge outlet and into the room.

Provision is made for the heating of indoor air through inlet openings 21 arranged in each end wall of the housing in the rear half thereof, which groups of inlet openings, one at each end, communicate each with a heating chamber 22 in the proximate rear corner of the housing.

Each heating chamber is walled off from the space constituting the discharge chamber which surrounds the arch shaped filter, by the provision of a partition 23 extending inwardly from the end wall to a point beyond the filter, so that streams of indoor air admitted at each end of the housing pass inwardly through the respective heating chambers at the rear of the housing and toward the center where said air streams are drawn into the intake of the fan.

Each of the heating chambers provides for the reception of a light weight radiator 24 which is preferably of the type now commonly used in unit heating devices, which serves to afford an extended radiating surface in ratio to the bulk and weight of the radiator.

In the present instance, the radiator comprises a wedge shaped core 25 upon which are mounted a multiplicity of rectangular fins 26 formed of metal having a high thermal conductivity, which arrangement gives to the radiator as a whole a rectangular configuration, each radiator being stood on end, as it were, within its heating chamber, so that it will extend vertically from a point near the base of the cabinet to a point near the top thereof and substantially fill the space afforded therefor within the heating chamber.

The inflow of heated air from each of the heating chambers toward the center of the cabinet is controlled by means of a vertically disposed flap damper 27, which in each instance is medially pivoted on a vertical pivot 28 to afford forward and rear wings 29 and 30 respectively, which, as shown, stand in oblique relation to one another.

The forward wing 29 when closed seats against a flange 31 near the inner edge of the partition wall 23, while the rear edge of the wing 30 in each instance when closed seats against the rear wall of the cabinet.

Fig. 2 in full lines shows the dampers closed, and indicates in dotted lines the positions occupied by the dampers when opened to admit hot air to the central spaces immediately adjacent to the mouth of the fan, which may properly be termed a mixing chamber, since it constitutes a space in which the streams of heated and cold air converge and are mixed together when the dampers are adjusted to an intermediate position.

The inflow of cold air through the cold air duct is regulated by a damper 32, consisting, as shown, of a plurality of leaves or sections.

In order to conjointly control the hot air and cold air dampers in harmonized relation to one another, and to make provision for the admission of cold air, either concurrently with or subsequently to the shutting off of the supply of heated recirculated indoor air, a suitable linkage is provided for correlating the operation of the respective dampers. As shown, the linkage includes a link 33 which is pivoted at one end to the forward leaf of one of the hot air dampers, and at its opposite end to the rear leaf of the companion hot air damper, so that a movement of the link in one direction will simultaneously open both of the hot air dampers either to the extreme limit or to an intermediate degree, while a movement of the link in the opposite direction will exert a closing action on both of said dampers simultaneously.

The link 33 is connected with the cold air damper sections in such a way that the latter will be closed as the hot air dampers are being opened, or if desired, which is the preferable arrangement in many cases, after the hot air dampers have been completely closed, so that where the latter arrangement is employed no cold air will be admitted until after the supply of heated air has been completely shut off. This latter arrangement, in which the hot and cold air dampers operate in sequence and in reverse relation rather than simultaneously, possesses a distinct advantage, in that it conserves the heat supply to the fullest extent, and at the same time avoids any possibility of admitting cold air by back draft under wind pressure to the heating chambers and in direct contact with the radiators located therein.

It will be understood, however, that the present invention contemplates any arrangement of hot air and cold air dampers which operate in opposition to one another either simultaneously or in sequential order, and in some cases it may be desirable to arrange the linkage so that the cold air damper will begin to open after the hot air dampers have been partially closed, so that there may be more or less of an overlap in the order of these operations instead of a non-overlapping sequence.

The present invention further contemplates that the adjustments in question may be made either by hand operated mechanism or thermostatically, and it is not intended to limit the invention, in so far as it relates to the general structure of the unit, to any particular order in the operation of the dampers, since the vertical arrangement of the radiators at opposite ends of the cabinet, combined with means for delivering outside air to the center of the cabinet, is deemed to constitute a distinct aspect of the invention, irrespective of any particular method provided for the control of the dampers, whether independently or in conjunction with one another.

As shown, steam or other heating fluid is circulated through the respective radiators by the provision of suitable piping enclosed within the housing, which piping, as shown, includes a supply header pipe 34 and a return header pipe 35, which piping is conveniently arranged within the cabinet in the discharge chamber space outside of the arch shaped filter.

In operation, when the temperature of the room in which the heating apparatus is located is below normal, the hot air dampers will be wide open and the cold air dampers will be tightly closed, so that all of the air passing through the apparatus will be recirculated from the room or chamber, and so that cold air will be excluded. During this operation, the temperature of the room rises, and in order to preserve a balance of temperature the hot air dampers will be gradually closed, while the cold air damper is gradually simultaneously opened to admit first some and gradually more outside air, with a corresponding reduction in circulation, until the proper balance is obtained and the temperature of the room is normal.

By proper arrangement of the linkage connecting the dampers, the opening of the cold air damper may be deferred more or less, or completely, until the hot air dampers have been completely closed, so that thereafter outside air only will be discharged through the apparatus. After a normal temperature has been established, it can be maintained under fluctuating conditions of normal heat balance, by moving the dampers one way or the other, either manually or by thermostatic means as occasion may require.

It is particularly to be noted that at no time during the operation of the apparatus it is necessary to heat fresh air which is admitted to maintain the heat balance, and further, in no instance is the fresh or cold air discharged by the fan against the radiators, so that the radiators are relieved from the burden of heating the cold outside air which is used only for tempering purposes.

During the operation of the apparatus, the maximum utilization of the heat units generated by the radiators is at all times obtained, and the inflow of fresh air is so regulated that the cold air will enter directly into the fan without being subjected to extensive contact with the walls of the hot air chambers, so that the outside air will not be subjected to radiated heat in any considerable degree, and the cooling effect of the admitted outdoor air will be maintained at a maximum.

Employment of the invention obviates the necessity of heating excessive volumes of fresh air over long periods of time which necessitates the expenditure of excessive and wasteful quantities of fuel, and means of maintaining normal heat balance without the preheating necessary in many other constructions.

By the arrangement of compartments and dampers described, there is no possibility of the fresh air flowing through the end inlets and into the room, since the suction of the fan maintains a direct inflow of outside air in the proper direction; but even if the fan were disabled, or entirely omitted, and incoming fresh air should reverse its flow, it would have to pass through the heating chambers and be subjected to the heat from the radiators before passing into the room.

One of the important features of the present construction relates to the vertical disposition of the radiators at each end of the cabinet. This arrangement allows the center of the casing to be employed for fan and filter in contradistinction to previous designs, in which a horizontal radiator has been employed above the fan and in an arrangement which requires additional height to adequately provide for the fan and radiator.

Since the height of the unit is limited to the space below a window sill, and since there are no practical limitations as to length of the cabinet, the present arrangement is one which adequately provides for the housing of the various instrumentalities within limits of space, which could not be advantageously accomplished in the case of other constructions with which I am familiar.

Furthermore, the vertically arranged radiators are less subject to water hammer or knocking than radiators of the horizontal type.

While the invention has been described in considerable detail, it will be understood that the arrangements shown serve merely for purposes of illustration, and that changes and modifications are contemplated within the scope of the claims appended hereto.

I claim:

1. In a unit ventilating and heating apparatus adapted to be placed in a chamber to be heated, the combination with a housing having an outlet opening at its top and inlet openings at each end, all three of said openings communicating with said chamber, and another inlet opening into said housing and communicating with outside air at atmospheric temperature; of a partition in said housing co-operating with the end inlet openings and the outside inlet opening to provide independent fresh air and twin heating compartments; a pair of vertical heating radiators disposed in said heating compartments; and a suction fan associated with the top outlet of said housing for inducing discharge of the air from said housing into said chamber.

2. In a unit ventilating and heating apparatus adapted to be placed in a chamber to be heated, the combination with a housing having an outlet opening at its top and inlet openings at each end, all three of said openings communicating with said chamber, and another inlet opening into said housing and communicating with outside air at atmospheric temperature; of a partition in said housing co-operating with the end inlet openings and the outside inlet opening to provide independent fresh air and twin heating compartments; a pair of vertical heating radiators disposed in said heating compartments; interconnected means for controlling the passage of air through said fresh air and said heating compartments; and a suction fan associated with the top outlet of said housing for inducing discharge of the air from said housing into said chamber.

3. In an air conditioning apparatus having a discharging orifice, two indoor air inlets and an outdoor air inlet, of means for confining the air from the outdoor inlet and the air from the indoor inlets during the entire operation of the apparatus in separate non-communicating streams directed toward said orifice; vertical conditioning elements located exclusively within the twin indoor air streams, means for controlling the streams of indoor air; and means for controlling the stream of outdoor air.

4. A conditioning apparatus adapted to be placed within a room to be atmospherically conditioned, provided with indoor air inlets at each end of apparatus from the interior of the room and a fresh air inlet opening exteriorly of the room, vertical air conditioning means located within each end of said apparatus, controlling means for regulating the intensity of the conditioning means, and controlling means for regulating the admission of cold air to the apparatus.

5. A conditioning apparatus adapted to be placed within a room to be atmospherically conditioned, provided with indoor air inlets at each end of apparatus from the interior of the room and a fresh air inlet opening exteriorly of the room, vertical air conditioning means located within each end of said apparatus, controlling means for regulating the admission of cold air to the apparatus, and means for unifying the action of said respective controlling means to effect increase in the volume of outdoor fresh air passing through said apparatus relatively to a restriction of the intensity of the conditioning means, and vice versa.

6. An apparatus of the character described, to be placed in a room in which the air is to be conditioned, said apparatus comprising a casing having vertical heating elements contained adjacent to the ends therein, said casing having a cold air inlet and two indoor warm air inlets, one at each end, and an outlet adapted to discharge into said room, and means within said casing for causing the forced discharge of the air from said casing through said outlet into said room.

7. An apparatus of the character described, to be placed in a room in which the air is to be conditioned, said apparatus comprising a casing having vertical heating elements contained adjacent to the ends therein, said casing having a cold air inlet and two indoor warm air inlets, one at each end, and an outlet adapted to discharge into said room, means within said casing for causing the forced discharge of the air from said casing through said outlet into said room; and interconnected means operable to admit cold air in ratio to a restriction of the effect of said heating element, and to restrict entrance of cold air in ratio to an increase in the effect of said heating element.

8. In a unit heating and ventilating apparatus adapted to be placed in a chamber to be heated, the combination with a housing having an outlet opening in its top portion and a pair of separated indoor air inlets, a pair of separated radiators receiving air respectively through said air inlets, a centrally disposed outdoor air inlet, and a centrally disposed fan adapted to discharge air admitted thereto from the indoor and outdoor air inlets, or from either thereof.

9. In a unit heating and ventilating apparatus adapted to be placed in a chamber to be heated, the combination with a housing having an outlet opening in its top portion and a pair of separated indoor air inlets, a pair of vertically standing separated radiators receiving air respectively through said indoor air inlets, a centrally disposed outdoor air inlet, and a centrally disposed fan adapted to discharge air admitted thereto from the indoor and outdoor air inlets, or from either thereof.

10. In a unit heating and ventilating apparatus adapted to be placed in a chamber to be heated, the combination with a housing having an outlet opening in its top portion and a pair of separated indoor air inlets, a pair of separated radiators receiving air respectively through said indoor air inlets, a centrally disposed outdoor air inlet, and a centrally disposed fan located directly in front of said outdoor air inlet and adapted to discharge air admitted thereto from the indoor and outdoor air inlets, or from either thereof.

11. In a unit heating and ventilating apparatus adapted to be placed in a chamber to be heated, the combination with a housing having an outlet opening in its top portion and a pair of separated indoor air inlets, a pair of vertically standing separated radiators receiving air respectively through said indoor air inlets, a centrally disposed outdoor air inlet, and a centrally disposed fan located directly in front of said outdoor air inlet and adapted to discharge air admitted thereto from the indoor and outdoor air inlets, or from either thereof.

12. In a unit heating and ventilating apparatus adapted to be placed in a chamber to be heated, the combination with a housing having an outlet opening in its top portion and a pair of separated indoor air inlets, a pair of separated radiators receiving air respectively through said indoor air inlets, a centrally disposed outdoor air inlet, and a centrally disposed fan located directly in front of said outdoor air inlet and adapted to discharge air admitted thereto from the indoor and outdoor air inlets, or from either thereof, and interconnected means for controlling the passage of air admitted through said respective inlets.

13. In a unit heating and ventilating apparatus adapted to be placed in a chamber to be heated, the combination with a housing having an outlet opening in its top portion and a pair of separated indoor air inlets, a pair of vertically standing separated radiators receiving air respectively through said indoor air inlets, a centrally disposed outdoor air inlet, and a centrally disposed fan located directly in front of said outdoor air inlet and adapted to discharge air admitted thereto from the indoor and outdoor air inlets, or from either thereof, and interconnected means for controlling the passage of air admitted through said respective inlets.

14. In a unit heating and ventilating apparatus adapted to be placed in a chamber to be heated, the combination with a housing having an outlet opening in its top portion and a pair of separated indoor air inlets, a pair of vertically standing separated radiators receiving air respectively through said indoor air inlets, a centrally disposed outdoor air inlet, and a centrally disposed fan located directly in front of said outdoor air inlet and adapted to discharge air admitted thereto from the indoor and outdoor air inlets, or from either thereof, and interconnected means for controlling the passage of air admitted through said respective inlets and operable in opposition to one another.

WILFRED SHURTLEFF.